(12) United States Patent
Huang et al.

(10) Patent No.: US 11,736,349 B2
(45) Date of Patent: Aug. 22, 2023

(54) SYSTEMS AND METHODS FOR PROVIDING FIRMWARE OVER-THE-AIR DELIVERY TO INTERNET OF THINGS USER EQUIPMENT

(71) Applicant: Verizon Patent and Licensing Inc., Basking Ridge, NJ (US)

(72) Inventors: Ye Huang, San Ramon, CA (US); Jin Yang, Orinda, CA (US); Rachel Ward, Lewisville, TX (US); Kristen Sydney Young, Morris Plains, NJ (US); Gulay Kurt Chrzanowski, Sudbury, MA (US); Prema Kumar Yendrapati, San Ramon, CA (US); Brian Matthew White, Port Murray, NJ (US); Carlos Cazanas, Bethelem, PA (US); John F. Gallagher, Hopewell, NJ (US); Martin A. Iroff, Alpharetta, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/997,407

(22) Filed: Aug. 19, 2020

(65) Prior Publication Data
US 2022/0060373 A1  Feb. 24, 2022

(51) Int. Cl.
*H04L 41/082* (2022.01)
*H04L 41/0654* (2022.01)

(52) U.S. Cl.
CPC ........ *H04L 41/082* (2013.01); *H04L 41/0654* (2013.01)

(58) Field of Classification Search
CPC .... H04L 67/34; H04L 41/082; H04L 41/0654
See application file for complete search history.

(56) References Cited

U.S. PATENT DOCUMENTS

| | | | |
|---|---|---|---|
| 6,404,739 B1* | 6/2002 | Gonno | H04L 1/1809 370/236 |
| 10,191,782 B2* | 1/2019 | Grobelny | G06F 1/3206 |
| 10,470,189 B2* | 11/2019 | Tran | H04W 72/048 |
| 2004/0233907 A1* | 11/2004 | Hundscheidt | H04L 45/302 370/390 |
| 2011/0305158 A1* | 12/2011 | Kim | H04W 72/005 370/252 |
| 2017/0013443 A1* | 1/2017 | Gopalakrishnan | H04W 68/02 |
| 2018/0352593 A1* | 12/2018 | Velev | H04W 24/08 |
| 2019/0069235 A1* | 2/2019 | Patil | H04W 52/0216 |

OTHER PUBLICATIONS

Wikipedia, "Zigbee," 2018. (Year: 2018).*

* cited by examiner

*Primary Examiner* — Andrew C Georgandellis

(57) ABSTRACT

A device associated with a network may provide a subscription request that requests data associated with the network and user equipment connected to the network. The device may receive, based on the subscription request, network congestion data associated with the network, reachability data associated with the user equipment, and location data associated with the user equipment. The device may determine a group of the user equipment based on the network congestion data, the reachability data, and the location data. The device may determine timing for providing firmware to the group based on capabilities of the user equipment in the group. The device may provide segments of the firmware to the network to cause the network to provide the segments of the firmware to the group based on the timing for providing the firmware to the group.

20 Claims, 8 Drawing Sheets

US 11,736,349 B2

1

SYSTEMS AND METHODS FOR PROVIDING FIRMWARE OVER-THE-AIR DELIVERY TO INTERNET OF THINGS USER EQUIPMENT

BACKGROUND

A manufacturer of an Internet of Things (IoT) user equipment (UE) (e.g. a narrowband IoT (NB-IoT) UE, a category M1 (Cat M1) IoT UE, and/or the like) may utilize firmware over-the-air (FOTA) technology to wirelessly upgrade firmware of the IoT UE without customer involvement. For example, by utilizing the FOTA technology, the manufacturer may remotely repair issues in the IoT UE, remotely install new software updates, features, and/or services in the IoT UE, and/or the like. However, because IoT devices may be in various forms of power savings mode, such FOTA updates are difficult to execute.

DETAILED DESCRIPTION OF PREFERRED EMBODIMENTS

Figure 1A:
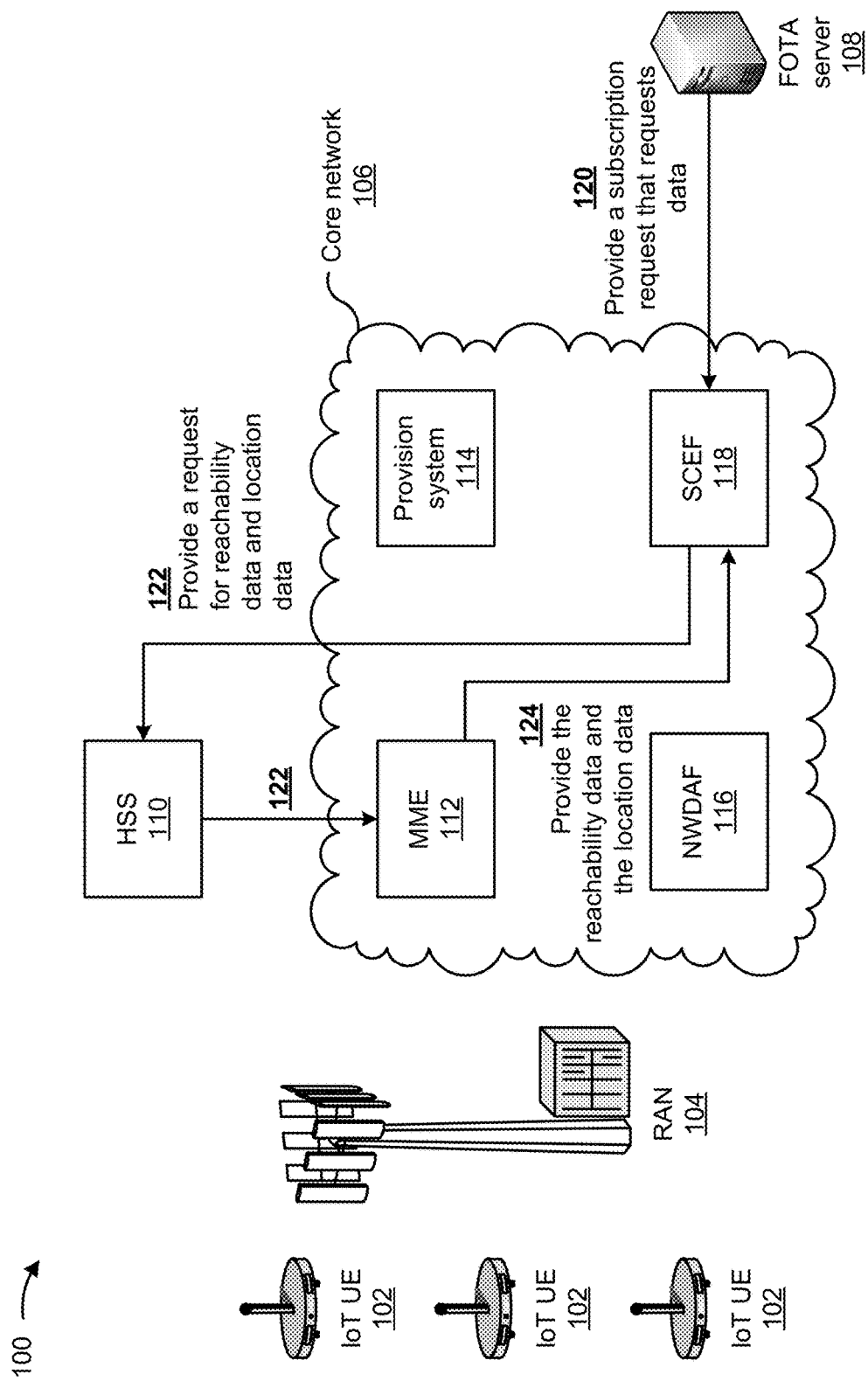
FIGS. 1A-1E are diagrams of one or more example implementations described herein.

The following detailed description of example implementations refers to the accompanying drawings. The same reference numbers in different drawings may identify the same or similar elements.

Internet of Things (IoT) user equipment (UEs), such as narrowband IoT (NB-IoT) UEs, category M1 (Cat M1) IoT UEs, and/or the like, may be configured to self-regulate by transmitting packets of data based on sensed conditions. By automating tasks that would otherwise require human monitoring and/or involvement, the IoT UEs may improve efficiency and reliability across a wide variety of applications, such as home appliances, utilities, healthcare equipment, transportation, and/or the like. However, because many IoT UEs run on batteries, the useful life of the IoT UEs may be limited by battery life. With billions of IoT UEs in the world, battery replacement may be enormously costly and ultimately negate the benefits of the service provided to the end user.

To reduce power consumption, an IoT UE may be configured to have extended discontinuous reception (eDRX) and/or a power saving mode (PSM). eDRX extends battery life of the IoT UE by momentarily switching off a receive chain of a radio module. PSM extends battery life even further by enabling the IoT UE to set sleep intervals during which time the radio module may not be contacted by the network. Whether using eDRX, PSM, or a combination of both, the IoT UE may conserve power that might otherwise be wasted by more frequently communicating with the network. Thus, the IoT UE may last significantly longer on a single limited power source.

In some cases, a manufacturer of the IoT UE may wish to update firmware of the IoT UE. For example, the manufacturer may wish to repair one or more bugs, errors, and/or security holes in the firmware, install one or more software updates, features, and/or services, and/or the like. So as to not involve the user in the updating process, which would undercut the automation benefit of the IoT UE, the manufacturer may utilize firmware over-the-air (FOTA) technology to implement the update. For example, the manufacturer may utilize a FOTA server to remotely repair the one or more bugs, errors, and/or security holes in the IoT UE, remotely install new software updates, features, and/or services in the IoT UE, and/or the like.

However, the FOTA server may face a number of technological obstacles in conducting the update of the firmware. For example, the FOTA server may be unaware that the IoT UE is unreachable (e.g., due the IoT UE being in an idle state, due to the IoT UE being in a highly congested location, and/or the like). Nonetheless, the FOTA server may attempt to reach the IoT UE. As a result, the FOTA server may consume computing resources (e.g., processing resources, memory resources, communication resources, and/or the like) and/or networking resources attempting to transmit data to the IoT UE while the IoT UE is unreachable. In some cases, the FOTA server may reach the IoT UE within a highly congested area, but as a result, may exacerbate network congestion and cause devices within the area to consume additional resources (e.g., battery resources, processor resources, and/or the like) to communicate with the network. As a further example, the FOTA server may attempt to update the firmware of a large amount of IoT UEs (e.g., thousands of IoT UEs, millions of IoT UEs, and/or the like). As a result, the FOTA server may consume a significant amount of computing resources (e.g., processing resources, memory resources, communication resources, and/or the like) and/or networking resources transmitting data discretely to the large amount of IoT UEs, resending the data after one or more IoT UEs failed to receive the data, and/or the like.

Some implementations described herein provide a device that obtains and utilizes data to efficiently coordinate delivery of FOTA to a plurality of UEs (e.g., IoT UEs) within a network. For example, a FOTA device or server may provide a subscription request that requests data associated with the network and associated with the plurality of IoT UEs connected to the network. The FOTA server may receive, based on the subscription request, network congestion data associated with the network, reachability data associated with the plurality of IoT UEs, and location data associated with the plurality of IoT UEs. The FOTA server may determine a group of IoT UEs, from the plurality of IoT UEs, based on the network congestion data, the reachability data, and the location data. The FOTA server may determine timing for providing firmware to the group of IoT UEs based on capabilities of the IoT UEs in the group. The FOTA server may cause the group of UEs to be created, by the network, for receiving the firmware. The FOTA server may provide segments of the firmware to the network, to cause the network to provide the segments of the firmware to the group of IoT UEs based on the timing for providing the firmware to the group of UEs.

By providing the firmware to the group of IoT UEs, based on data associated with the IoT UEs and the network, the FOTA server may more efficiently deliver the FOTA to the IoT UEs, thereby conserving resources. For example, by utilizing the reachability data and/or the network congestion data to determine the timing for providing the firmware, the FOTA server may conserve computing resources (e.g., processing resources, memory resources, communication resources, and/or the like) and/or networking resources that might otherwise have been consumed attempting to transmit data to the IoT UE while the IoT UE is unreachable. Furthermore, the FOTA server may conserve resources (e.g., battery resources, processor resources, and/or the like) that might otherwise have been consumed by other devices within a congested area attempting to communicate with the network. As another example, by providing the firmware to the group of IoT UEs, the FOTA server may conserve computing resources (e.g., processing resources, memory resources, communication resources, and/or the like) and/or networking resources that might otherwise have been consumed transmitting data discretely to the plurality of IoT UEs, resending the data after one or more IoT UEs failed to receive the data, and/or the like.

In the description to follow, a process relating to providing closed-loop network controlled FOTA delivery to a plurality of IoT UEs will be described with respect to a fourth generation (4G) network. However, it should be understand that the process may be implemented within a fifth generation (5G) network or another type of network. Further, it should be understood that the process is not limited to IoT-UEs and is thus applicable to other types of UEs.

FIGS. 1A-1E are diagrams of one or more example implementations 100 described herein. As shown in FIGS. 1A-1E, a plurality of internet of things (IoT) user equipment (UEs) 102 (e.g., narrowband IoT (NB-IoT) UEs, category M1 (Cat M1) IoT UEs, a combination thereof, and/or the like) may be associated with a network. The network may include a radio access network (RAN) 104, a core network 106, a firmware over-the-air (FOTA) server 108, and a home subscriber server (HSS) 110. The RAN 104 may include a base station with one or more radio transmitters. The core network 106 may include physical elements, virtual elements, or a combination of physical and virtual elements. The FOTA server 108 may include a server device that provides data (e.g., associated with firmware) to the plurality of IoT UEs 102 and/or receives data from the plurality of IoT UEs 102. The HSS 110 may include a server device that maintains UE profiles, including subscription information associated with the plurality of IoT UEs 102, information about a physical location of the plurality of IoT UEs 102, and/or the like.

As shown in FIGS. 1A-1E, the core network 106 may include a mobility management entity (MME) 112, a provision system 114, a network data analytics function (NWDAF) 116, a service capability exposure function (SCEF) 118, and/or the like. The MME 112 may include a main control node that is responsible for tracking, paging, and authenticating the plurality of IoT UEs 102. The provision system 114 may include a device that is configured to create a group of the IoT UEs 102 to receive the firmware. An NWDAF 116 may include a network interface that is responsible for providing, upon request, network analysis information (e.g., network congestion information, trend information, and/or the like). The SCEF 118 may include a gateway interface that is configured to securely expose and/or discover services and capabilities provided by other network interfaces.

In FIG. 1A, assume that the plurality of IoT UEs 102 have registered with the FOTA server 108 to receive firmware updates as needed. For example, an IoT UE 102, of the plurality of IoT UEs 102, may transmit a request for registration, including identifying information about the IoT UE 102 (e.g., a customer identifier of a customer associated with the IoT UE 102, an identifier of the IoT UE 102, and/or the like), to the FOTA server 108. Upon receipt of the request for registration, the FOTA server 108 may authenticate the IoT UE 102 and store the identifying information in a data structure for later access.

In FIG. 1A, assume further that the FOTA server 108 has been configured to transmit firmware updates to the plurality of IoT UEs 102 via a closed-loop non-Internet protocol data delivery (NIDD) system. For example, the FOTA server 108 may engage in an NIDD configuration request and NIDD configuration answer exchange with the SCEF 118. The SCEF 118, in turn, may engage in an NIDD information request and NIDD information answer exchange with the HSS 110. By configuring the FOTA server 108 to transmit the firmware updates via the closed-loop NIDD system, the FOTA server 108 may reduce the size of messages by eliminating Internal Protocol (IP) headers from the messages and, thus, conserve resources (e.g., computing resources, networking resources, and/or the like) that would otherwise have been consumed transmitting and processing the messages having an IP format. Furthermore, with such a NIDD configuration, the FOTA server 108 may allow an IoT UE 102 to concurrently process firmware updates and application data within the same reachable window. Thus, the FOTA server 108 may conserve resources that might otherwise have been consumed by an application server attempting to transmit application data to the IoT UE 102 while the IoT UE 102 is processing a firmware update, by the IoT UE 102 attempting to process the application data while the IoT UE 102 is processing the firmware update, and/or the like.

In FIG. 1A, assume that the FOTA server 108 has obtained a firmware update to be delivered to the plurality of IoT UEs 102. To begin the process of FOTA delivery to the plurality of IoT UEs 102, and as shown by reference number 120 in FIG. 1A, the FOTA server 108 may provide a subscription request that requests data associated with the network and associated with the plurality of IoT UEs 102. As an example, the data may include network congestion data, reachability data, location data, as described in more detail below. The congestion data may be associated with the network, and the reachability data and the location data may be associated with the plurality of IoT UEs 102.

To provide the subscription request to the SCEF 118, the FOTA server 108 may transmit the subscription request to the SCEF 118 via one or more application programming interfaces (APIs), via a communication addressed to a network address of the SCEF 118, and/or the like. Thus, the FOTA server 108 may trigger a sequence of communications within the core network 106 to coordinate and enable the closed-loop FOTA delivery to the plurality of IoT UEs 102.

As shown by reference number 122, and based on receiving the subscription request, the SCEF 118 may provide a request for reachability data and location data to the HSS 110. With respect to an IoT UE 102 of the plurality of IoT UEs 102, the reachability data may include the identifying information about the IoT UE 102 (e.g., the customer identifier of the customer associated with the IoT UE 102, the identifier of the IoT UE 102, and/or the like), a power saving mode (PSM) schedule of the IoT UE 102 (e.g., a first timer value, a second timer value, and/or the like), an extended discontinuous reception (eDRX) schedule of the IoT UE 102 (e.g., a paging time window (PTW), an eDRX cycle length, and/or the like), and/or the like), a current reachability status of the IoT UE 102, a last reachable date and/or time of the IoT UE 102, a last disconnect date and/or time of the IoT UE 102, a next disconnect date and/or time of the IoT UE 102, and/or the like.

The location data may include the identifying information associated with the plurality of IoT UEs 102 (e.g., the customer identifiers of the respective customers associated with the plurality of IoT UEs 102, the identifiers of the IoT UEs 102, and/or the like) and/or identifiers associated with the RAN 104 (e.g., a cell identifier, a base station identifier, and/or the like). Because the HSS 110 contains the location data along with additional identifying information about plurality of IoT UEs 102, the HSS 110 may enable communication with the plurality of IoT UEs 102. For example, the HSS 110 may access user profiles associated respectively with the plurality of IoT UEs 102 and transmit the location data and the additional identifying information, along with the request for the reachability data and the location data (e.g., as shown by reference number 122), to the MME 112.

The MME 112, as the main control node within the core network 106, may be configured to obtain the reachability data. With respect to the IoT UE 102, the MME 112 may obtain the reachability data associated with the IoT UE 102 during an attachment procedure. For example, the IoT UE 102 may transmit an attach request to the MME 112. As part of the attach request, the IoT UE 102 may specify a "Non-IP" type of connection and may request eDRX parameters, including a PTW and/or an eDRX cycle length, to implement an eDRX configuration. Additionally, or alternatively, the IoT UE 102 may request PSM parameters, including a first timer value and/or a second timer value, to implement a PSM configuration. The first timer value may define a time that the IoT UE 102 remains reachable following attachment to the core network 106. The second timer value may be a tracking area update (TAU) timer, according to which the IoT UE 102 notifies the MME 112 of reachability of the UE 102.

The MME 112, in response to the attach request, may engage in an update location request (ULR) and an update location answer (ULA) exchange with the HSS 110 in order to assess a subscription associated with the IoT UE 102 (e.g., determine whether the subscription is paid-to-date, determine whether the subscription permits certain types of services, and/or the like) and authorize the IoT UE 102. After authorizing the IoT UE 102 and determining and storing the eDRX and/or PSM parameters, the MME 112 may provide an attach accepted message to the IoT UE 102. The attach accepted message may include the eDRX parameters (e.g., the PTW, the eDRX cycle length, and/or the like) to define the eDRX schedule and/or the PSM parameters (e.g., the first timer value, the second timer value, and/or the like) to define the PSM schedule. The IoT UE 102 may finalize attachment by transmitting a UE attach complete message to the MME 112.

In some implementations, the MME 112 may obtain the reachability data associated with the IoT UE 102 during a TAU procedure. For example, after the IoT UE 102 and the MME 112 have negotiated the eDRX configuration and/or the PSM configuration, the IoT UE 102 may move into a different tracking area while the IoT UE 102 is unreachable. Upon waking, the IoT UE 102 may transmit a TAU request to the MME 112 to provide updated location information. Similar to the attach request, the TAU request may include a request for updated eDRX parameters (e.g., an updated PTW window, an updated eDRX cycle, and/or the like) and/or updated PSM parameters (e.g., an updated first timer value, an updated second timer value, and/or the like). After determining and storing the updated PTW, the updated eDRX cycle, the updated first timer value, and/or the updated second timer value, the MME 112 may provide a TAU accepted message to the IoT UE 102. The TAU accepted message may include the updated eDRX parameters to update the eDRX schedule and/or the updated PSM parameters to update the PSM schedule.

Over time, the MME 112 may compile and store information relating to the eDRX configuration and/or the PSM configuration to define the reachability data. For example, based on current and historical information of the IoT UE 102, the MME 112 may store the PSM schedule, the eDRX schedule, the current reachability status of the IoT UE 102, the last reachable date and/or time associated with the IoT UE 102, the next reachable date and/or time associated with the IoT UE 102, the last disconnect date and/or time associated with the IoT UE 102, the next disconnect date and/or time associated with the IoT UE 102, and/or the like.

Based on the request for the reachability data and the location data, the MME 112 may access the reachability data and the location data associated with the plurality of IoT UEs 102. As shown by reference number 124, the MME 112 may provide the reachability data and the location data to the SCEF 118. Upon receipt of the reachability data and the location data, the SCEF 118 may store the reachability data and the location data for later access and/or transmission. By understanding when the plurality of IoT UEs 102 are capable of receiving firmware updates, the SCEF 118 may be able to assist with coordinating timing of providing the firmware to the plurality of IoT UEs 102 and conserve networking and/or computing resources that might have otherwise been consumed attempting to transmit the data while one or more of the plurality of IoT UE 102 are unreachable. Furthermore, by understanding where the plurality of IoT UEs 102 are located, the SCEF 118 may be able to assist with coordinating grouping of the IoT UEs 102 for more efficient delivery of the firmware.

Figure 1B:
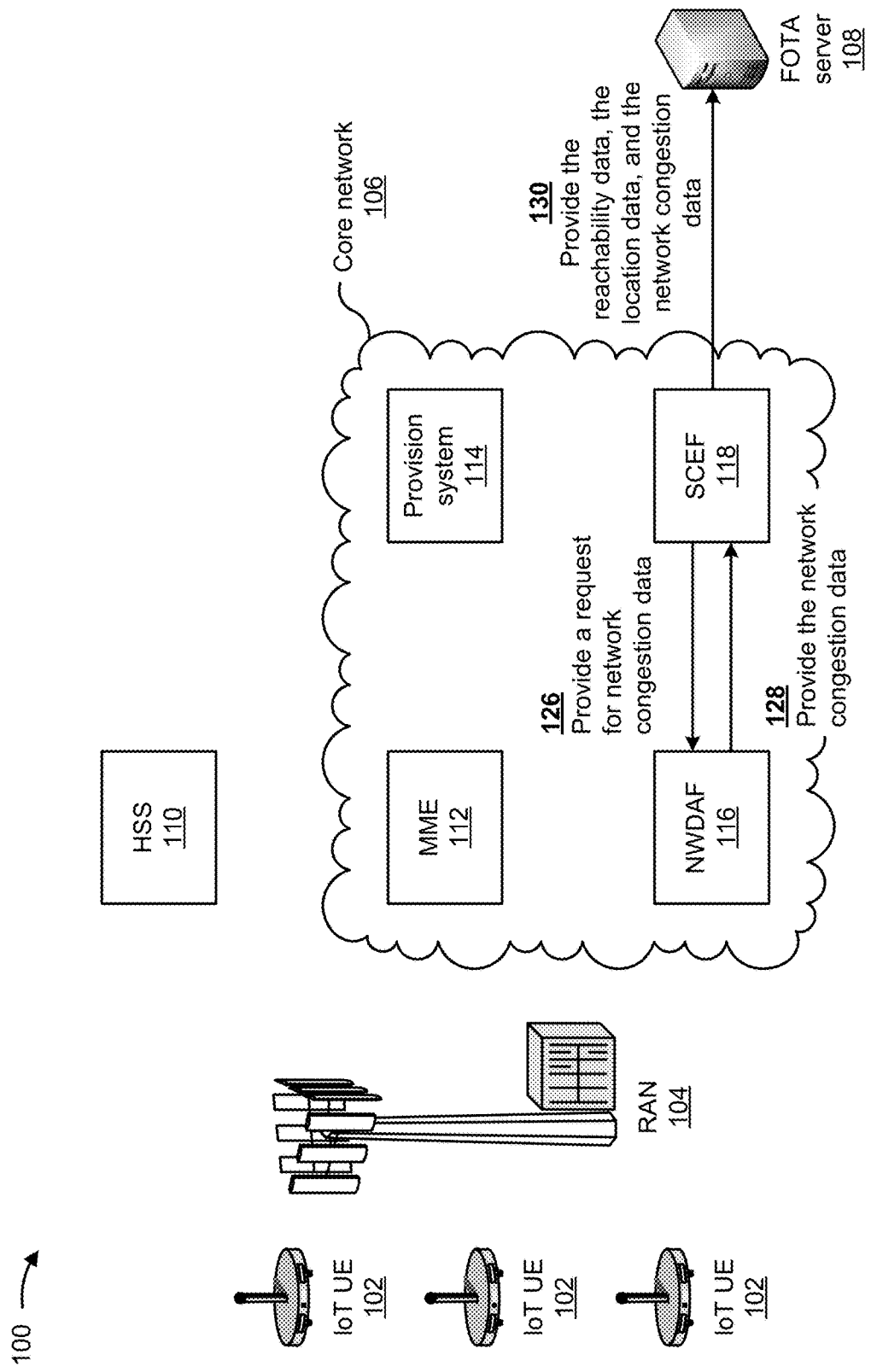

As shown by reference number 126 of FIG. 1B, and based on receiving the subscription request (e.g., as shown by reference number 120 in FIG. 1A), the SCEF 118 may provide a request for network congestion data to the NWDAF 116. The request for the network congestion data may include, from the location data, the identifiers associated with the RAN 104 (e.g., the cell identifier, the base station identifier, and/or the like). The network congestion data may include the identifiers associated with the RAN 104 (e.g., the cell identifier, the base station identifier, and/or the like), radio access technology (RAT) associated with the RAN 104, bandwidth congestion levels of the RAN 104, trends of the bandwidth congestion levels of the RAN 104, and/or a maximum concurrent session limit for the RAN 104.

Based on receiving the request for network congestion data, the NWDAF 116 may communicate with the RAN 104 to obtain the bandwidth congestion levels of the RAN 104, determine the trends of the bandwidth congestion levels of the RAN 104 and the maximum concurrent session limit for the RAN. By understanding which, if any, of the plurality of IoT UEs 102 are located in areas experiencing network congestion, the SCEF 118 may be able to assist with coordinating grouping of the IoT UEs for more efficient delivery of the firmware. Furthermore, by analyzing the trends of the bandwidth congestion levels, the SCEF 118 may be able to assist with coordinating timing of providing the firmware to the plurality of IoT UEs 102 and thus conserve networking and/or computing resources that might have otherwise been consumed attempting to transmit the data while the IoT UE 102 is unreachable.

As shown by reference number 128, and based on obtaining the network congestion data, the NWDAF 116 may provide the network congestion data to the SCEF 118. After the SCEF 118 receives the network congestion data, and as shown by reference number 130, the SCEF 118 may provide the reachability data, the location data, and the network data to the FOTA server 108 based on the subscription request.

Figure 1C:
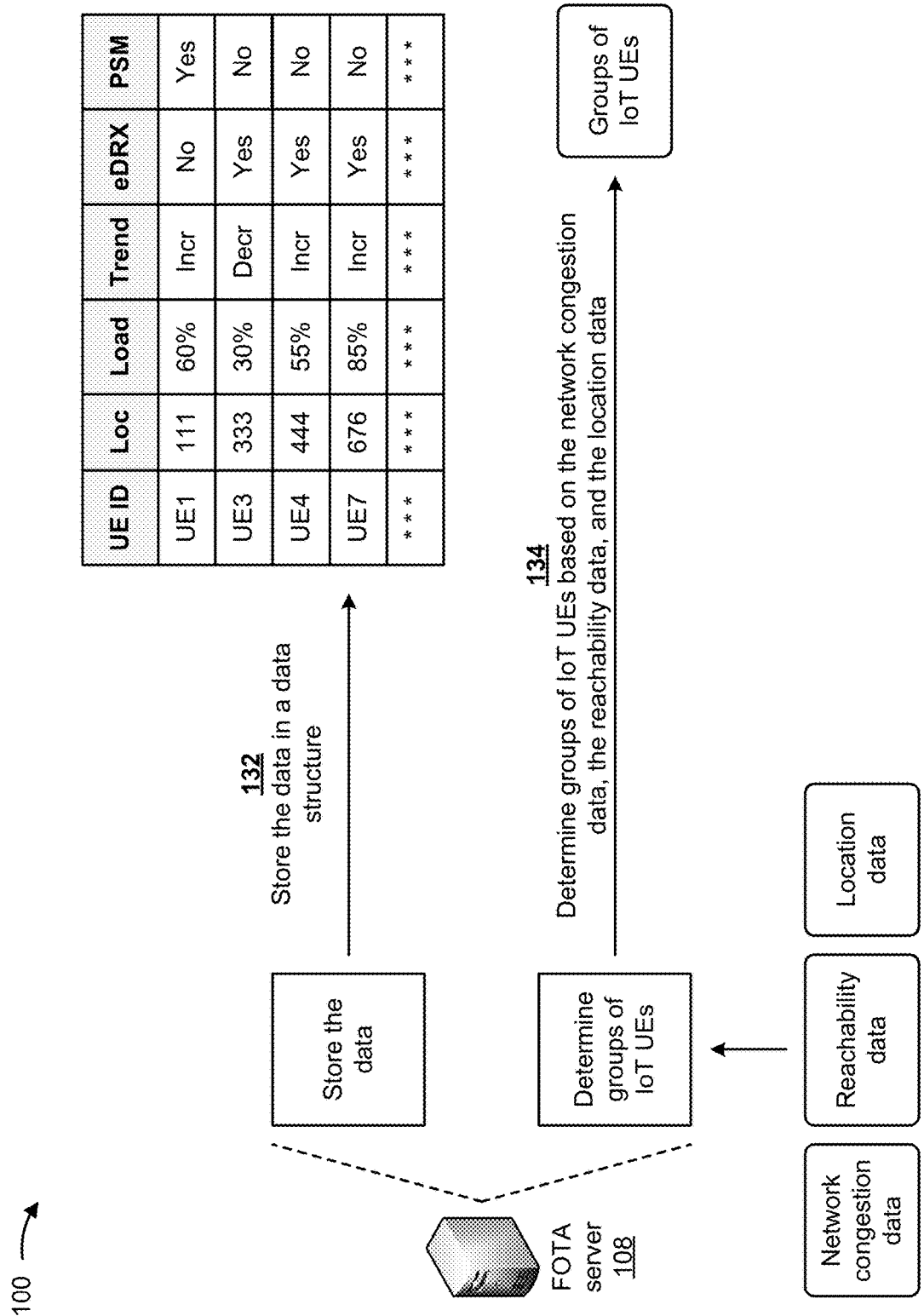

As shown by reference number 132 in FIG. 1C, the FOTA server 108, upon receipt of the reachability data, the location data, and the network congestion data, may store the reachability data, the location data, and the network congestion data in a data structure. Because the location data includes data present in both the reachability data (e.g., the identifying information about the IoT UEs 102) and the network congestion data (e.g., the identifiers associated with the RAN 104), the location data may form a point of connection between the reachability data and the network congestion data. Thus, using the location data as a baseline, the FOTA server 108 may match the reachability data with the network congestion data within the data structure. For example, the FOTA server 108 may populate the data structure with the identifying information about the plurality of IoT UEs 102 (e.g., the customer identifiers of the customers associated with the plurality of IoT UEs 102, the identifiers of the plurality of IoT UEs 102 ("UE ID"), and/or the like) and the identifiers associated with the RAN 104 (e.g., the cell identifier ("Loc"), the base station identifier, and/or the like). Additionally, or alternatively, the FOTA server 108, for each IoT UE 102, may populate the data structure with remaining reachability data, such as whether the IoT UE 102 is configured for eDRX and/or PSM, a PSM schedule of the IoT UE 102 (e.g., a first timer value, a second timer value, and/or the like), an eDRX schedule of the IoT UE 102 (e.g., a paging time window (PTW), an eDRX cycle length), and/or the like), a current reachability status of the IoT UE 102, a last reachable date and/or time of the IoT UE 102, a last disconnect date and/or time of the IoT UE 102, a next disconnect date and/or time of the IoT UE 102, and/or the like. Additionally, or alternatively, the FOTA server 108, for each IoT UE 102, may populate the data structure with remaining network congestion data, such as information identifying the RAT associated with the RAN 104, the bandwidth congestion levels of the RAN 104 ("Load"), the trends of the bandwidth congestion levels of the RAN 104 ("Trend"), and/or the maximum concurrent session limit for the RAN 104.

As shown by reference number 134, and based on the reachability data, the location data, and the network congestion data, the FOTA server 108 may determine a group of IoT UEs 102, of the plurality of IoT UEs 102, to receive the firmware. To determine the group, the FOTA server 108 may calculate a maximum quantity of IoT UEs 102 to include in the group, based on the bandwidth congestion levels of the RAN 104, the trends of the bandwidth congestion levels of the RAN 104, and/or the maximum concurrent session limit for the RAN 104. For example, the maximum quantity of IoT UEs 102 may be less than or equal to 10. Once the maximum quantity of IoT UEs 102 is determined, to deliver the firmware efficiently, the FOTA server 108 may select IoT UEs 102, in an amount less than or equal to the maximum quantity, to form a group based on common locations of the IoT UEs 102, based on common PSM and/or eDRX capability of the IoT UEs 102, based on common reachability of the IoT UEs 102, and/or the like.

Figure 1D:
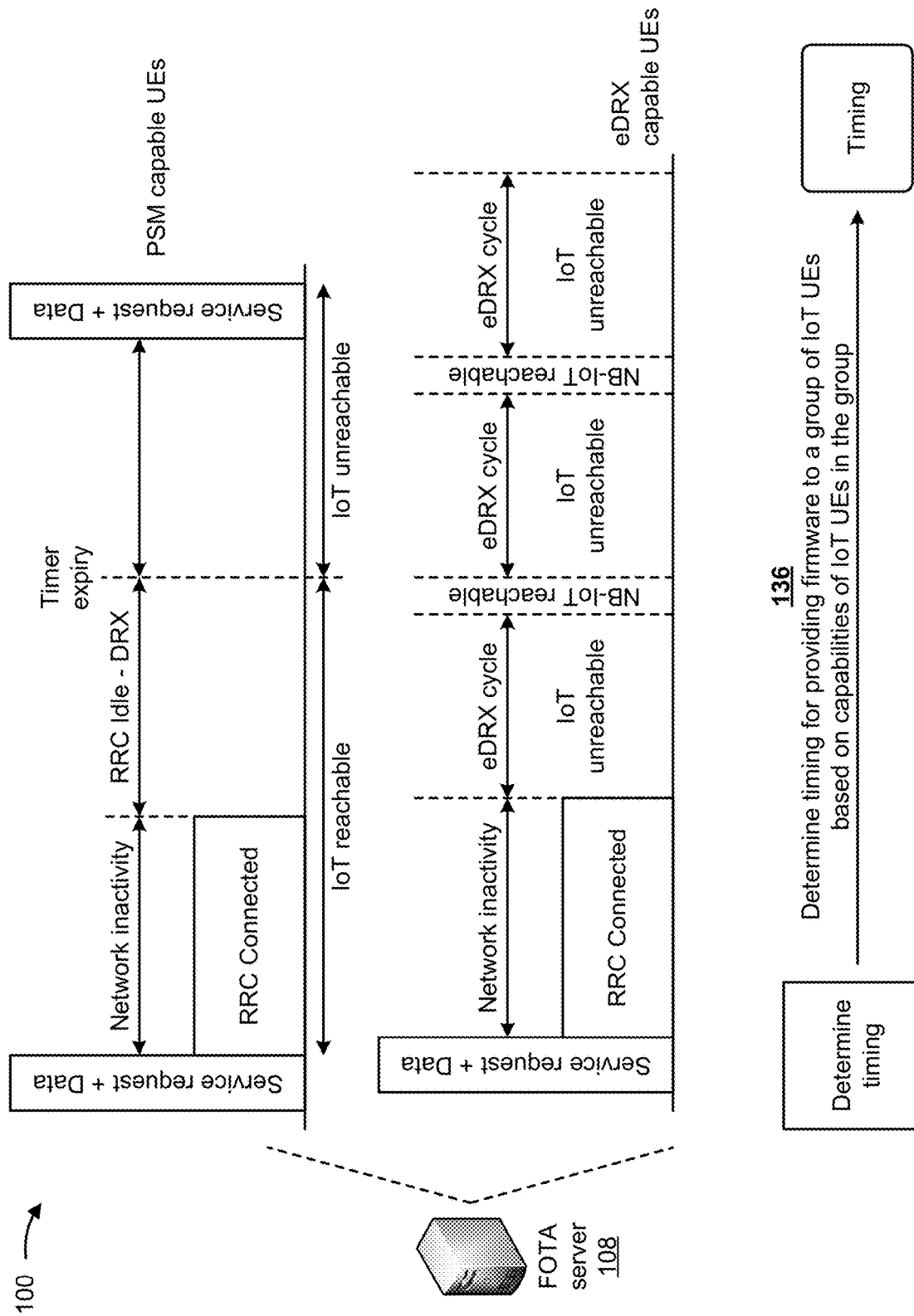

As shown by reference number 136 in FIG. 1D, the FOTA server 108 may determine timing for providing the firmware to the group of IoT UEs 102 based on capabilities of the IoT UEs 102 in the group. The capabilities may include whether the IoT UEs 102 have PSM configurations, eDRX configurations, and/or the like. For example, for an IoT UE 102 having a PSM configuration, the FOTA server 108 may determine the timing based on the PSM schedule (e.g., a first timer value, a second timer value, and/or the like), a current reachability status of the IoT UE 102, a last reachable date and/or time of the IoT UE 102, a next disconnect date and/or time of the IoT UE 102, and/or the like. As a further example, for an IoT UE 102 having an eDRX configuration, the FOTA server 108 may determine the timing based on the eDRX schedule of the IoT UE 102 (e.g., a paging time window (PTW), an eDRX cycle length), and/or the like), a current reachability status of the IoT UE 102, a last reachable date and/or time of the IoT UE 102, a last disconnect date and/or time of the IoT UE 102, a next disconnect date and/or time of the IoT UE 102, and/or the like.

Figure 1E:
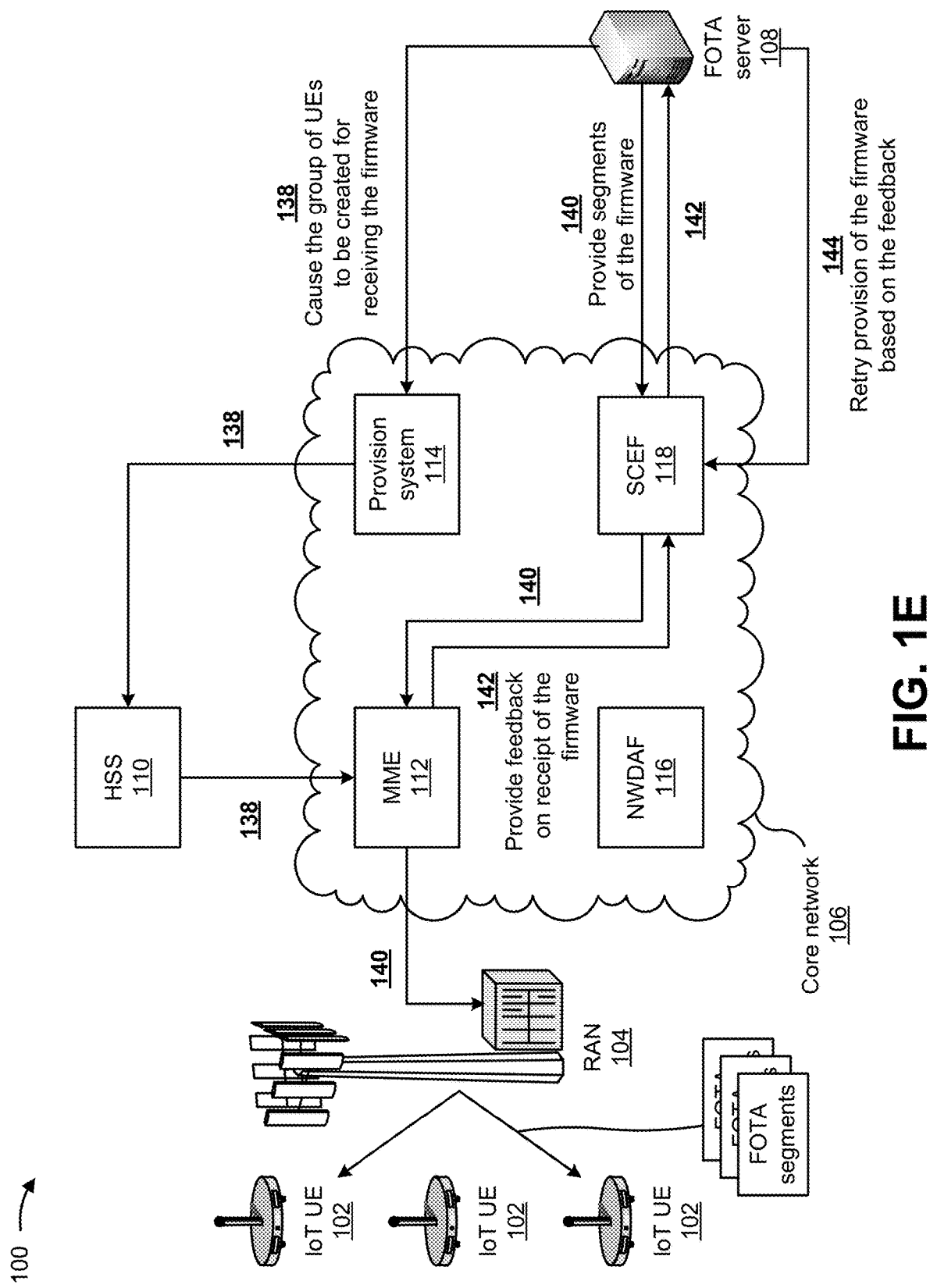

As shown by reference number 138 in FIG. 1E, the FOTA server 108 may cause the group of IoT UEs 102 to be created for receiving the firmware. For example, the FOTA server 108 may transmit a multicast setup request to the provision system 114. The multicast setup request may include an identifier of the group of IoT UEs 102, the identifying information about the IoT UEs 102, and/or the like. Based on the multicast setup request, the provision system 114 may create the group and transmit the identifier of the group, along with the identifying information about the IoT UEs 102, to the HSS 110 for storage (e.g., in a multicast data structure, and/or the like). The HSS 110, in turn, may transmit the identifier of the group and the identifying information about the IoT UEs 102 within the group to the MME 112 to prepare the MME 112 to distribute packets of data to the group.

To transmit the firmware to the group of IoT UEs 102, the FOTA server 108 may divide the firmware into segments of the firmware. Each of the segments of the firmware may include a particular payload size so that each of the segments may be provided in an NIDD payload. As shown by reference number 140, the FOTA server 108 may provide the segments of the firmware to the core network 106 to cause the core network 106 to provide the segments of the firmware to the group of IoT UEs 102 based on the timing for providing the firmware to the group of IoT UEs 102. For example, as shown by reference number 140, the segments of the firmware, along with the identifier of the group and an indication of the timing, may be routed from the SCEF 118, to the MME 112, to the RAN 104, and lastly to the group of IoT UEs 102.

In some implementations, the MME 112 may determine that at least one of the IoT UEs 102 within the group of IoT UEs 102 failed to receive the firmware. In such a case, as shown by reference number 142, the MME 112 may provide feedback to the SCEF 118 indicating that the at least one of the IoT UEs 102, in the group of IoT UEs 102, failed to receive the firmware. The SCEF 118 may, in turn, provide the feedback to the FOTA server 108 to notify the FOTA server 108. Based on the feedback, as shown by reference number 144, the FOTA server 108 may provide the segments of the firmware to the core network 106 to cause the core network 106 to retry providing the segments of the firmware to the at least one of the IoT UEs 102 (e.g., via the path shown by reference number 140). By resolving failed delivery issues discretely, the FOTA server 108 may conserve resources that might otherwise have been consumed resending firmware to the entire group of IoT UEs 102.

By providing the firmware to the group of IoT UEs via NIDD, the FOTA server 108 may more efficiently deliver the FOTA to the IoT UEs and thus conserve resources. For example, by utilizing NIDD, the FOTA server 108 may conserve resources that would otherwise have been consumed transmitting and processing messages having an IP format. As another example, by utilizing the reachability data and/or the network congestion data to determine the timing for providing the firmware, the FOTA server 108 may conserve resources that might otherwise have been consumed by the FOTA server 108 attempting to transmit data to the IoT UE while the IoT UE is unreachable, by other devices attempting to communicate with the network from a congested area, and/or the like. As a further example, by providing the firmware to the group of IoT UEs, the FOTA server 108 may conserve that might otherwise been consumed transmitting data discretely to the plurality of IoT UEs, resending the data after one or more IoT UEs failed to receive the data, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
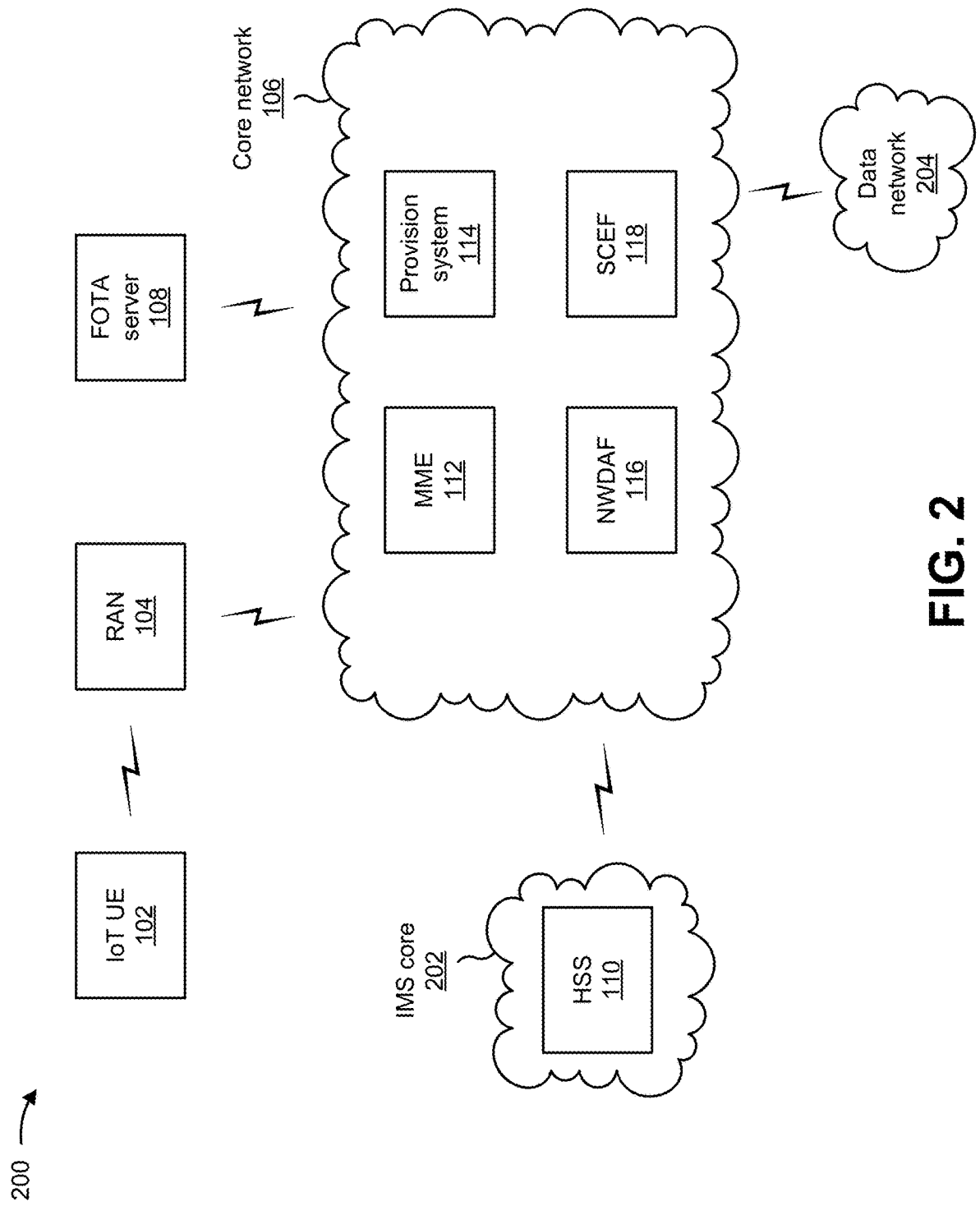
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200, which may include a 4G architecture, may include IoT UE 102, RAN 104, core network 106, FOTA server 108, internet protocol (IP) multimedia subsystem (IMS) core 202, and data network 204. The core network 106 may include MME 112, provision system 114, NWDAF 116, and SCEF 118. The IMS core 202 may include HSS 110. The devices of environment 200 may interconnect via wired connections, wireless connections, or a combination of wired and wireless connections.

IoT UE 102 includes one or more devices capable of gathering, receiving, storing, processing, providing, and/or transmitting information and/or data. For example, IoT UE 102 may include a network device (e.g., a modem, a switch, a gateway, and/or the like), a sensing device, a metering device, a mobile phone (e.g., a smart phone, a radiotelephone, and/or the like), a computing device (e.g., a server, a desktop computer, a laptop computer, a tablet computer, a handheld computer, a camera, an audio recorder, a camcorder, and/or the like), an appliance (e.g., a thermostat, an oven, a refrigerator, a microwave, an oven, a stove, and/or the like), a medical device, a biometric device, a wearable device, an automobile, a railcar, an airplane, a light bulb, a switch, an actuator, a timer, a signal detection device (e.g., to detect the presence of a signal, such as a Bluetooth signal, an infrared signal, and/or the like), a machine-to-machine (M2M) device, and/or a similar type of device. In order words, IoT UE 102 may be a "thing" in the IoT. In some implementations, IoT device 205 may include an interface for short range wireless communication protocols (e.g., Bluetooth low energy, Institute of Electrical and Electronics Engineers (IEEE) 802.154 ZigBee, and/or the like) and/or a long range wireless communication protocols (e.g., LTE category M1, 5G category M1, LTE category NB-IoT, 5G category NB-IoT, 3G, 2G GSM, and/or the like) that may allow IoT UE 102 to receive information from and/or transmit information to another device in environment 200.

RAN 104 may support, for example, a cellular radio access technology (RAT). RAN 104 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and one or more other network entities that may support wireless communication for IoT UE 102. RAN 104 may transfer traffic between IoT UE 102 (e.g., using a cellular RAT), base stations (e.g., using a wireless interface or a backhaul interface, such as a wired backhaul interface), and/or core network 106. RAN 104 may provide one or more cells that cover geographic areas.

RAN 104 may perform scheduling and/or resource management for IoT UE 102 covered by RAN 104 (e.g., IoT UE 102 covered by a cell provided by RAN 104). In some implementations, RAN 104 may be controlled or coordinated by a network controller, which may perform load balancing, network-level configuration, and/or the like. The network controller may communicate with RAN 104 via a wireless or wireline backhaul. In some implementations, RAN 104 may include a network controller, a self-organizing network (SON) module or component, or a similar module or component. In other words, RAN 104 may perform network control, scheduling, and/or network management functions (e.g., for uplink, downlink, and/or sidelink communications of IoT UE 102 covered by RAN 104).

Core network 106 may include an evolved packet core (EPC) network that operates based on a third generation partnership project (3GPP) wireless communication standard. Core network 106 may include MME 112, provision system 114, NWDAF 116, and SCEF 118. HSS 110 may reside in core network 106 and/or the IMS core 202. The IMS core 202 may manage device registration and authentication, session initiation, and/or the like, associated with IoT UE 102.

FOTA server 108 includes one or more devices capable of receiving, generating, storing, processing, and/or providing information. For example, FOTA server 108 may include a server device or a group of server devices, a cloud computing device, a data center device, or a similar type of device. FOTA server 108 may receive information from and/or transmit information to core network 106.

HSS 110 includes one or more devices capable of managing (e.g., receiving, generating, storing, processing, providing, and/or the like) information associated with IoT UE 102. For example, HSS 110 may include a server device or a group of server devices, a cloud computing device, a data center device, or a similar type of device. HSS 110 may manage subscription information associated with IoT UE 102, such as information associated with a subscriber profile of a user associated with IoT UE 102, information associated with services and/or applications that are accessible to IoT UE 102, location information associated with IoT UE 102, a network identifier (e.g., a network address) associated with IoT UE 102, information associated with a treatment of IoT UE 102 (e.g., quality of service information, a quantity of minutes allowed per time period, a quantity of data consumption allowed per time period, and/or the like), and/or the like. HSS 110 may provide this information to one or more other devices of environment 200 to support the operations performed by those devices.

MME 112 includes one or more devices capable of managing authentication, activation, deactivation, and/or mobility functions associated with IoT UE 102. For example, MME 112 may include a server device or a group of server devices, a cloud computing device, a data center device, or a similar type of device. MME 112 may perform operations relating to authentication of IoT UE 102. MME 112 may perform operations associated with handing off IoT UE 102 from a first RAN 104 to a second RAN 104 when IoT UE 102 is transitioning from a first cell associated with the first RAN 104 to a second cell associated with the second RAN 104. Additionally, or alternatively, MME 112 may select another MME (not shown), to which IoT UE 102 should be handed off (e.g., when IoT UE 102 moves out of range of MME 112).

Provision system 114 includes one or more devices capable of receiving, generating, storing, processing, and/or providing information. For example, provision system 114 may include a server device or a group of server devices, a cloud computing device, a data center device, or a similar type of device. Provision system 114 may create groups of IoT UEs 102 based on information received from the FOTA server 108 and transmit information associated with the groups to one or more devices within the core network 106.

NWDAF 116 includes one or more devices that receive, store, generate, determine, provide, and/or the like information. For example, NWDAF 116 may include a server device or a group of server devices, a cloud computing device, a data center device, or a similar type of device. NWDAF 116 may obtain from the RAN 104 and/or determine network congestion data associated with the RAN 104.

SCEF 118 includes one or more devices that receive, store, generate, determine, provide, and/or the like information. For example, SCEF 118 may include a server device or a group of server devices, a cloud computing device, a data center device, or a similar type of device. SCEF 118 may perform one or more actions performed by a network exposure function (NEF) and/or a network repository function (NRF).

Data network 204 includes one or more wired and/or wireless data networks. For example, data network 204 may include an IMS, a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
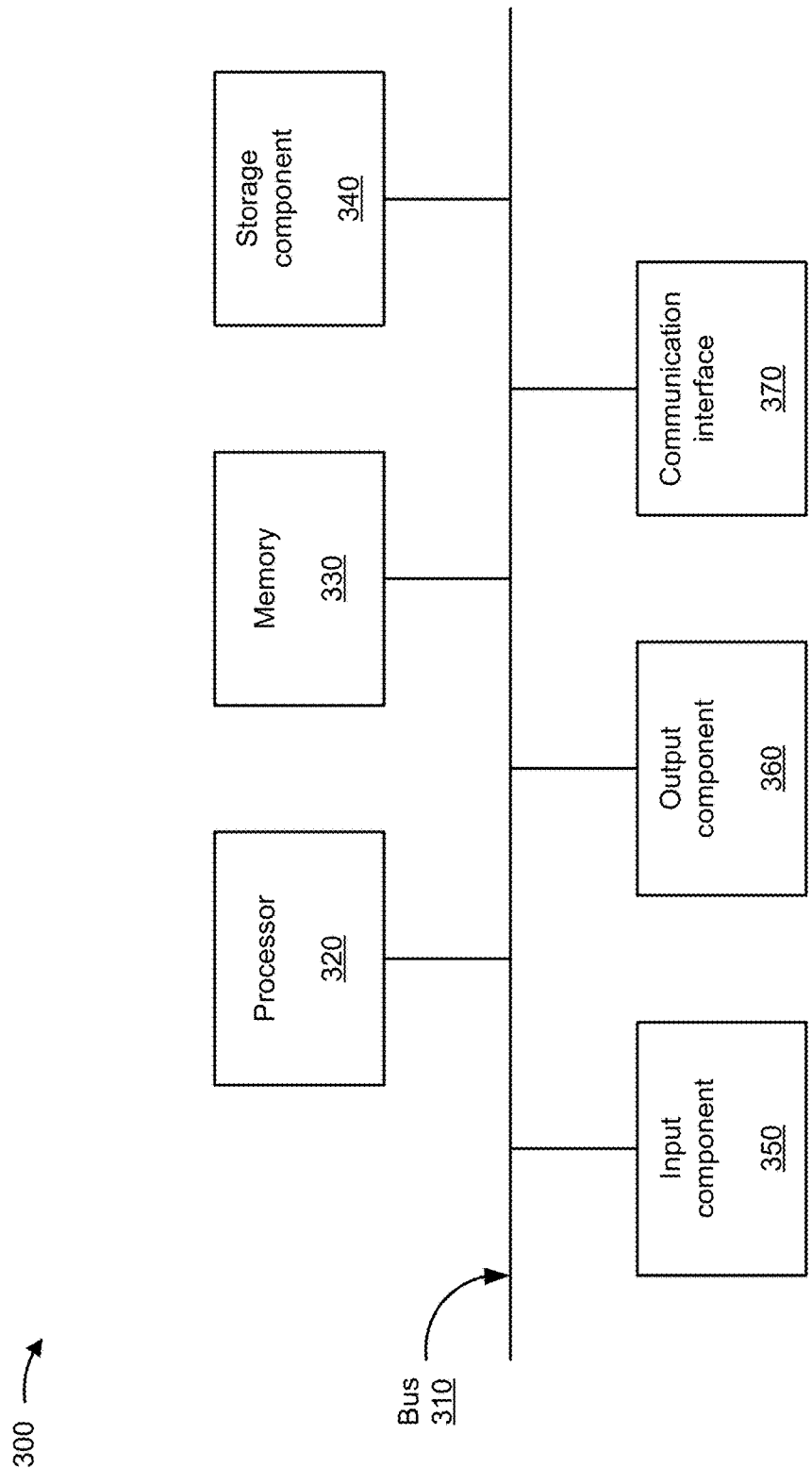
FIG. 3 is a diagram of example components of one or more devices of FIG. 2.

FIG. 3 is a diagram of example components of a device 300. Device 300 may correspond to IoT UE 102, FOTA server 108, HSS 110, MME 112, provision system 114, NWDAF 116, and/or SCEF 118. In some implementations, IoT UE 102, FOTA server 108, HSS 110, MME 112, provision system 114, NWDAF 116, and/or SCEF 118 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
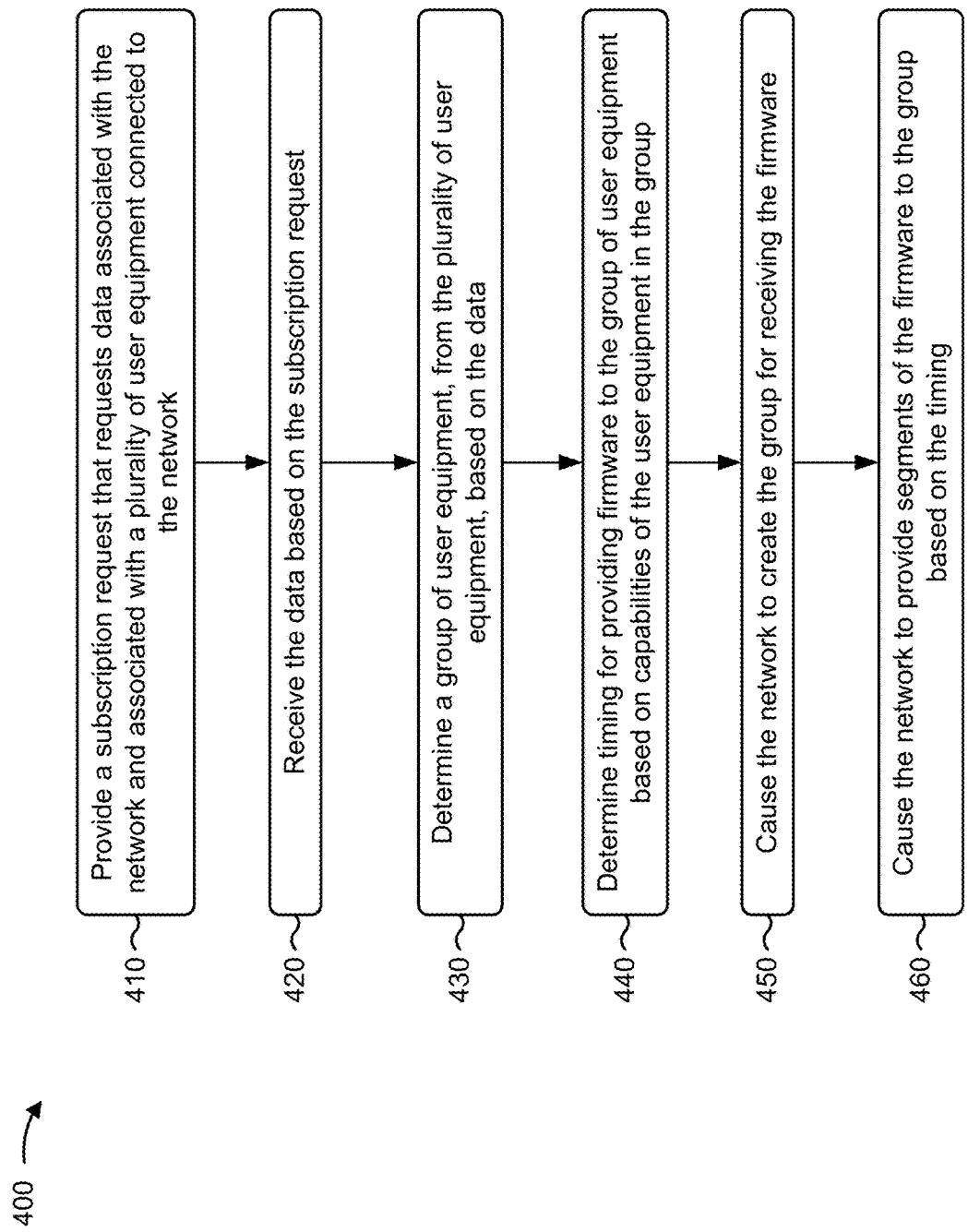
FIG. 4 is a flow chart of an example process relating to providing closed-loop network controlled firmware over-the-air delivery to internet of things user equipment.

FIG. 4 is a flowchart of an example process 400 associated with providing closed-loop network controlled firmware over-the-air delivery to narrowband internet of things user equipment. In some implementations, one or more process blocks of FIG. 4 may be performed by a device (e.g., FOTA server 108). In some implementations, one or more process blocks of FIG. 4 may be performed by another device or a group of devices separate from or including the device, such as an IoT UE (e.g., IoT UE 102), an HSS (e.g., HSS 110), an MME (e.g., MME 112), a provision system (e.g., provision system 114), an NWDAF (e.g., NWDAF 116), and/or an SCEF (e.g., SCEF 118). Additionally, or alternatively, one or more process blocks of FIG. 4 may be performed by one or more components of device 300, such as processor 320, memory 330, storage component 340, input component 350, output component 360, and/or communication interface 370.

As shown in FIG. 4, process 400 may include providing a subscription request that requests data associated with the network and associated with a plurality of user equipment connected to the network (block 410). For example, the device may provide a subscription request that requests data associated with the network and associated with a plurality of user equipment connected to the network, as described above. The plurality of user equipment may include a plurality of narrowband Internet of Things equipment.

As further shown in FIG. 4, process 400 may include receiving the data based on the subscription request (block 420). For example, the device may receive the data based on the subscription request, as described above. The data may include network congestion data associated with the network, reachability data associated with the plurality of user equipment, and location data associated with the plurality of user equipment. The network congestion data may include one or more of: identifiers associated with radio access networks of the network, radio access technologies associated with the radio access networks, bandwidth congestion levels of the radio access networks, trends of the bandwidth congestion levels, or a maximum concurrent session limit per each of the radio access networks. The reachability data may include one or more of: identifiers associated with the plurality of user equipment, power saving mode schedules associated with the plurality of user equipment, or extending discontinuous reception schedules associated with the plurality of user equipment. The location data may include one or more of: identifiers associated with the plurality of user equipment, or identifiers associated with radio access networks of the network currently utilized by the plurality of user equipment.

As further shown in FIG. 4, process 400 may include determining a group of user equipment, from the plurality of user equipment, based on the data (block 430). For example, the device may determine a group of user equipment, from the plurality of user equipment, based on the data, as described above. Determining the group of user equipment may include determining a maximum quantity of user equipment to include in the group of user equipment, and determining the group of the user equipment, from the plurality of user equipment, based on the network congestion data, the reachability data, the location data, and the maximum quantity. Determining the group of user equipment may include receiving an input indicating a maximum quantity of user equipment to include in the group of user equipment, and determining the group of user equipment, from the plurality of user equipment, based on the network congestion data, the reachability data, the location data, and the maximum quantity.

As further shown in FIG. 4, process 400 may include determining timing for providing firmware to the group of user equipment based on capabilities of the user equipment in the group (block 440). For example, the device may determine timing for providing firmware to the group of user equipment based on capabilities of the user equipment in the group, as described above.

As further shown in FIG. 4, process 400 may include causing the network to create the group for receiving the firmware (block 450). For example, the device may cause the network to create the group for receiving the firmware, as described above.

As further shown in FIG. 4, process 400 may include causing the network to provide segments of the firmware to the group based on the timing (block 460). For example, the device may provide segments of the firmware to the network, to cause the network to provide the segments of the firmware to the group of user equipment based on the timing for providing the firmware to the group of user equipment, as described above. Causing the network to provide segments of the firmware may include providing the segments of the firmware to the network. Providing the segments of the firmware may include: providing an identifier of the group of user equipment, wherein the identifier causes the network to provide the segments of the firmware to the group of user equipment based on the timing for providing the firmware to the group of user equipment. Providing the segments of the firmware may include providing the segment of the firmware to the network via non-Internet protocol data delivery messages. Each segment of the firmware may include a particular payload size so that each of the segments of the firmware may be provided within a non-Internet protocol data delivery payload.

In some implementations, process 400 may further include storing the network congestion data, the reachability data, and the location data in a data structure. In some implementations, process 400 may further include dividing the firmware into segments of the firmware.

In some implementations, process 400 may further include receiving feedback indicating that at least one of the user equipment, in the group of user equipment, failed to receive the firmware, and providing, based on the feedback, the segments of the firmware to the network to cause the network to retry providing the segments of the firmware to the at least one of the user equipment. Receiving the feedback may include receiving a list identifying two or more user equipment, in the group of user equipment, that failed to receive the firmware. Providing the segments may include providing, based on the list, the segments of the firmware to the network to cause the network to retry providing the segments of the firmware to the two or more equipment.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   providing, by a device associated with a network, a subscription request that requests data associated with the network and associated with a plurality of narrowband Internet of Things (NB-IoT) user equipment connected to the network,
      wherein the data includes network congestion data associated with the network, reachability data relating to an extended discontinuous reception (eDRX) configuration, and location data associated with the plurality of NB-IoT user equipment,
         wherein the network congestion data identifies at least one of bandwidth congestion levels of radio access networks of the network, trends of the bandwidth congestion levels, or a maximum concurrent session limit for each of the radio access networks,
         wherein the reachability data identifies eDRX schedules that are provided by the plurality of NB-IoT user equipment, and
         wherein the eDRX configuration, based on the eDRX schedules, is configured to conserve battery resources of the plurality of NB-IoT user equipment;
   receiving, by the device and based on the subscription request, the data;
   determining, by the device and based on the data, a group of NB-IoT user equipment, from the plurality of NB-IoT user equipment,
      wherein determining the group of NB-IoT user equipment comprises:
         calculating a maximum quantity of NB-IoT user equipment to include in the group of NB-IoT user equipment based on the network congestion data, and
         selecting NB-IoT user equipment, of the plurality of NB-IoT user equipment, based on the reachability data indicating common reachability of the NB-IoT user equipment, to form the group of NB-IoT user equipment,
            wherein a quantity of NB-IoT user equipment in the group of NB-IoT user equipment is less than or equal to the maximum quantity of NB-IoT user equipment;
   determining, by the device, timing for providing firmware to the group of NB-IoT user equipment based on capabilities of the NB-IoT user equipment in the group of NB-IoT user equipment,
      wherein the capabilities relate to the eDRX configuration;
   causing, by the device, the network to create the group of the NB-IOT user equipment for receiving the firmware;
   providing, by the device, segments of the firmware to the network; and
   causing, by the device, the network to provide the segments of the firmware to the group of NB-IoT user equipment based on the timing for providing the firmware to the group of NB-IoT user equipment.

2. The method of claim 1, further comprising:
   receiving feedback indicating that at least one of the NB-IoT user equipment, in the group of NB-IoT user equipment, failed to receive the firmware; and
   providing, based on the feedback, the segments of the firmware to the network to cause the network to retry providing the segments of the firmware to the at least one of the NB-IoT user equipment.

3. The method of claim 1, wherein the network congestion data includes one or more of:
  identifiers associated with the radio access networks, or
  radio access technologies data associated with the radio access networks.

4. The method of claim 1, wherein the reachability data includes:
  identifiers associated with the plurality of NB-IoT user equipment.

5. The method of claim 1, wherein the location data includes one or more of:
  identifiers associated with the plurality of NB-IoT user equipment, or
  identifiers associated with the radio access networks of the network currently utilized by the plurality of NB-IoT user equipment.

6. The method of claim 1, wherein providing the segments of the firmware to the network comprises:
  providing an identifier of the group of NB-IoT user equipment,
    wherein the identifier causes the network to provide the segments of the firmware to the group of NB-IoT user equipment based on the timing for providing the firmware to the group of NB-IoT user equipment.

7. The method of claim 1, wherein selecting the NB-IoT user equipment to form the group of NB-IoT user equipment is further based on the location data indicating common locations of the NB-IoT user equipment.

8. The method of claim 1,
  wherein the eDRX configuration is configured to conserve the battery resources of the plurality of NB-IoT user equipment by momentarily switching off a receive chain of a radio module.

9. A device associated with a network, the device comprising:
  one or more processors configured to:
    provide a subscription request that requests data associated with the network and associated with a plurality of narrowband Internet of Things (NB-IoT) user equipment connected to the network,
      wherein the data includes network congestion data associated with the network, reachability data relating to an extended discontinuous reception (eDRX) configuration, and location data associated with the plurality of NB-IoT user equipment,
      wherein the network congestion data identifies at least one of bandwidth congestion levels of radio access networks of the network, trends of the bandwidth congestion levels, or a maximum concurrent session limit for each of the radio access networks,
      wherein the reachability data identifies eDRX schedules that are provided by the plurality of NB-IoT user equipment; and
      wherein the eDRX configuration is configured to conserve battery resources of the plurality of NB-IoT user equipment;
    receive, based on the subscription request, the data;
    determine a group of NB-IoT user equipment, from the plurality of NB-IoT user equipment, based on the data,
      wherein the one or more processors, when determining the group of NB-IoT user equipment, are further configured to:
        calculate a maximum quantity of NB-IoT user equipment to include in the group of NB-IoT user equipment based on the network congestion data, and
        select NB-IoT user equipment, of the plurality of NB-IoT user equipment, based on the reachability data indicating common reachability of the NB-IoT user equipment, to form the group of NB-IoT user equipment,
          wherein a quantity of NB-IoT user equipment in the group of NB-IoT user equipment is less than or equal to the maximum quantity of NB-IoT user equipment;
    determine timing for providing firmware to the group of NB-IoT user equipment based on capabilities of the NB-IoT user equipment in the group of NB-IoT user equipment,
      wherein the capabilities relate to the eDRX configuration;
    cause the group of the NB-IoT user equipment to be created, by the network, for receiving the firmware;
    provide segments of the firmware to the network to cause the network to provide the segments of the firmware to the group of NB-IoT user equipment based on the timing for providing the firmware to the group of NB-IoT user equipment;
    receive feedback indicating that at least one of the NB-IoT user equipment, in the group of NB-IoT user equipment, failed to receive the firmware; and
    provide, based on the feedback, the segments of the firmware to the network to cause the network to retry providing the segments of the firmware to the at least one of the NB-IoT user equipment.

10. The device of claim 9, wherein the one or more processors are further configured to:
  divide the firmware into the segments of the firmware,
    wherein each of the segments of the firmware includes a particular payload size so that each of the segments of the firmware may be provided within a non-Internet protocol data delivery payload.

11. The device of claim 9, wherein the one or more processors, when calculating the maximum quantity of NB-IoT user equipment to include in the group of NB-IoT user equipment, are configured to:
  receive an input indicating the maximum quantity of NB-IoT user equipment to include in the group of NB-IoT user equipment.

12. The device of claim 9, wherein the one or more processors, when providing the segments of the firmware to the network, are configured to:
  provide the segments of the firmware to the network via non-Internet protocol data delivery messages.

13. The device of claim 9, wherein the one or more processors are further configured to:
  receive a list identifying two or more NB-IoT user equipment, in the group of NB-IoT user equipment, that failed to receive the firmware; and
  provide, based on the list, the segments of the firmware to the network to cause the network to retry providing the segments of the firmware to the two or more NB-IoT user equipment.

14. The device of claim 9, wherein the one or more processors, when selecting the NB-IoT user equipment to form the group of NB-IoT user equipment, are configured to:

select the NB-IoT user equipment to form the group of NB-IoT user equipment based further on the location data indicating common locations of the NB-IoT user equipment.

15. A non-transitory computer-readable medium storing instructions, the instructions comprising:
one or more instructions that, when executed by one or more processors of a device associated with a network, cause the one or more processors to:
provide a subscription request that requests data associated with the network and associated with a plurality of narrowband Internet of Things (NB-IoT) user equipment connected to the network,
wherein the data includes:
network congestion data associated with the network,
wherein the network congestion data identifies at least one of bandwidth congestion levels of radio access networks of the network, trends of the bandwidth congestion levels, or a maximum concurrent session limit for each of the radio access networks,
reachability data relating to an extended discontinuous reception (eDRX) configuration,
wherein the reachability data identifies eDRX schedules that are provided by the plurality of NB-IoT user equipment, and
wherein the eDRX configuration is configured to conserve battery resources of the plurality of NB-IoT user equipment, and
location data associated with the plurality of NB-IoT user equipment;
receive, based on the subscription request, the data;
store the data in a data structure;
determine a group of NB-IoT user equipment, from the plurality of NB-IoT user equipment, based on the data,
wherein the one or more instructions, that cause the one or more processors to determine the group of NB-IoT user equipment, cause the one or more processors to:
calculate a maximum quantity of NB-IoT user equipment to include in the group of NB-IoT user equipment based on the network congestion data, and
select NB-IoT user equipment, of the plurality of NB-IoT user equipment, based on the reachability data indicating common reachability of the NB-IoT user equipment, to form the group of NB-IoT user equipment,
wherein a quantity of NB-IoT user equipment in the group of NB-IoT user equipment is less than or equal to the maximum quantity of NB-IoT user equipment;
determine timing for providing firmware to the group of NB-IoT user equipment based on capabilities of the NB-IoT user equipment in the group of NB-IoT user equipment,
wherein the capabilities relate to the eDRX configuration;
cause the group of the NB-IoT user equipment to be created, by the network, for receiving the firmware; and
provide segments of the firmware to the network to cause the network to provide the segments of the firmware to the group of NB-IoT user equipment based on the timing for providing the firmware to the group of NB-IoT user equipment.

16. The non-transitory computer-readable medium of claim 15, wherein the one or more instructions, when executed by the one or more processors, further cause the one or more processors to:
receive feedback indicating that at least one of the NB-IoT user equipment, in the group of NB-IoT user equipment, failed to receive the firmware; and
provide, based on the feedback, the segments of the firmware to the network to cause the network to retry providing the segments of the firmware to the at least one of the NB-IoT user equipment.

17. The non-transitory computer-readable medium of claim 15, wherein the one or more instructions, that cause the one or more processors to provide the segments of the firmware to the network to cause the network to provide the segments of the firmware to the group of NB-IoT user equipment, cause the one or more processors to:
provide an identifier of the group of NB-IoT user equipment,
wherein the identifier causes the network to provide the segments of the firmware to the group of NB-IoT user equipment based on the timing for providing the firmware to the group of NB-IoT user equipment.

18. The non-transitory computer-readable medium of claim 15, wherein the one or more instructions, when executed by the one or more processors, further cause the one or more processors to:
divide the firmware into the segments of the firmware,
wherein each of the segments of the firmware includes a particular payload size so that each of the segments of the firmware may be provided within a non-Internet protocol data delivery payload.

19. The non-transitory computer-readable medium of claim 15, wherein the one or more instructions, that cause the one or more processors to provide the segments of the firmware to the network, cause the one or more processors to:
provide the segments of the firmware to the network via non-Internet protocol data delivery messages.

20. The non-transitory computer-readable medium of claim 15, wherein the one or more instructions, that cause the one or more processors to select the NB-IoT user equipment to form the group of NB-IoT user equipment, cause the one or more processors to:
select the NB-IoT user equipment to form the group of NB-IoT user equipment based further on the location data indicating common locations of the NB-IoT user equipment.

* * * * *